March 24, 1970     F. M. HEWITT     3,502,186

OIL-MIST FEED AND LEVEL SIGHT ASSEMBLY

Filed June 14, 1968

INVENTOR

Frederick M. Hewitt

BY Norton Lesser

ATTORNEY

/ Patented Mar. 24, 1970

3,502,186
OIL-MIST FEED AND LEVEL SIGHT ASSEMBLY
Frederick M. Hewitt, Barrington, Ill., assignor to Stewart-Warner Corporation, Chicago, Ill., a corporation of Virginia
Filed June 14, 1968, Ser. No. 737,051
Int. Cl. F16n 31/00
U.S. Cl. 184—103                                    4 Claims

ABSTRACT OF THE DISCLOSURE

An assembly including a vertically adjustable, transparent oil level sight and bleed hole carried by a closed bearing housing with the oil mist delivery tube passing through the center of the coupling.

---

Pumps, turbines, machine tools and the like have been lubricated by delivering lubricant under air pressure, in the form of an oil mist, through thin tubes or other closed passages to separate closed bearing housings. The fog-like mixture of oil and air condenses and collects as a body of liquid within the bearing housing. Unfortunately, since the bearing is normally at a remote location and within a sealed housing or casing, the machine operator has no knowledge of the exact level of the collected lubricant within the bearing housing. Further, since the lubrication system operates with the bearing housing oil level within maximum and minimum limits, it is desirable that the ma-machine operator may easily and instantaneously know the level of lubricant for any one bearing. It is, of course, a further advantage if the machine operator may readily adjust the level of accumulated liquid lubricant which is being delivered to the individual bearing housing.

It is therefore a primary object of this invention to provide a unitary assembly which may be readily coupled to a bearing housing and which allows the level of the lubricant to be visually observed and adjustably controlled.

It is a further object of this invention to provide an assembly of this type which further allows lubricant in the form of oil mist to be delivered to the bearing housing through the same coupling mechanism.

It is a further object of this invention to provide an assembly of this type which facilitates condensation of the oil mist at the area of delivery to the bearing housing.

Other objects of this invention will be pointed out in the following detailed description and claims and illustrated in the accompanying drawings which disclose, by way of example, the principle of the invention and the best mode contemplated of applying that principle.

DETAILED DESCRIPTION OF THE INVENTION

Figure 1:
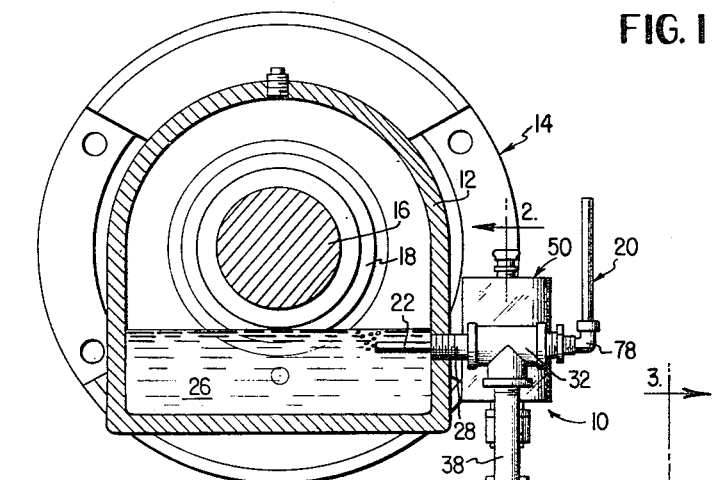
FIGURE 1 is an elevational view of the oil mist feed, level sight and control assembly of the present invention mounted on a centrifugal pump bearing assembly.
Figure 2:
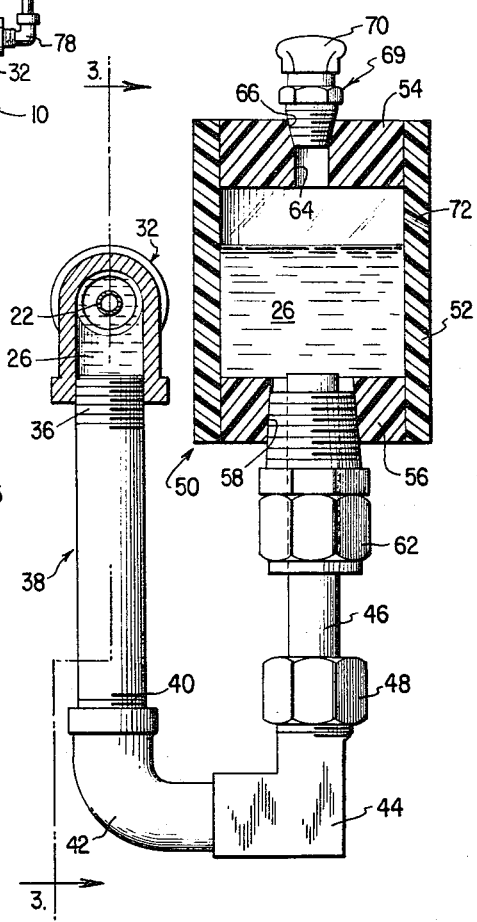
FIGURE 2 is a sectional view of the assembly of the present invention taken about lines 2—2 of FIGURE 1.

In general, the apparatus of the present invention comprises a combined oil level sight and bleed chamber of transparent plastic which is adjustably carried by the vertically oriented terminal end of a rigid conduit having its opposite end coupled to and in fluid communication with the closed bearing housing of a centrifugal pump or the like. The transparent oil level sight and bleed chamber includes a downwardly inclined bleed hole within the side wall which defines the level of lubricant within both the sight chamber and the closed bearing housing.

The rigid conduit also carries internally, a small diameter oil mist delivery tube having its delivery end terminating within the closed bearing housing. A right angle portion of the oil mist delivery tube, exterior of the rigid conduit and facilitates condensation of the lubricant.

Turning to the drawings, the oil mist feed and level sight assembly 10 of the present invention is shown as being rigidly coupled to a bearing housing 12 which forms a part of a large machine 14 requiring lubrication. In this respect, rotating shaft 16 is supported by one or more bearing members 18 within the bearing housing 12. The oil mist delivery tube 20 is coupled to a tube portion 22, the terminal end of which extends within the bearing housing 12 and delivers lubricant in the form of oil mist, which escapes from the open end of the oil mist delivery tube 22 to form a collected body of liquid oil lubricant 26 at a predetermined level within the bearing housing 12. If the oil level is low, mist exiting from tube 22 simply blows a depressed portion in the liquid surface and if the oil level is high, velocity is reduced and air escapes in bubble form.

Rigid conduit means are employed for coupling the oil mist feed and level sight elements of the assembly to the bearing housing 12. In this respect, a nipple conduit or coupling member 28 has its left end threadably received within the bearing housing vertical side wall opening 30, while its right end is threadably received within a conventional T 32. The base 34 of the T is threadably coupled to one end 36 of nipple 38, the bottom end 40 of which is coupled to elbow 42. L-shaped body 44 completes the U turn. It is coupled to the elbow 42 at one end, and to a vertically extending tube 46 at the other end, by fitting 48. Vertical tube 46 extends upwardly from fitting 48 and the transparent oil level sight and bleed chamber 50 is attached thereto. Chamber 50 is formed preferably of transparent plastic material including a cylindrical side wall portion 52 and top and bottom end walls 54 and 56, respectively. The bottom wall 56 of the sight chamber 50 is centrally apertured at 58 and threadably receives nipple 60 just above vertically adjustable fitting 62. The fitting 62 is internally threaded, and is carried on the upper end of tube 46 such that the clear plastic oil level sight and bleed chamber 50 may be vertically adjusted relative to closed bearing housing 12. The upper end wall 54 of this chamber is also centrally apertured at 64 and threaded at 66 to receive a threaded vent member 68. A loose fitting cap 70 is carried by the vent member 68 and the vent member 68 is centrally apertured (not shown) so that gases, such as air, in the chamber pass through the vent member to the atmosphere.

From this description, it is easily seen that accumulated liquid lubricant 26 passes readily between the oil mist delivery tube 22 and the rather large bore of nipple 28, into the interior of T 32, through nipple 38, elbow 42, body 44 and tube 46 and thence into the interior of the oil level sight and bleed chamber 50. Thus, accumulated oil 26 will continue to rise in both bearing housing 12 and the sight chamber 50 until, depending upon the rate of delivery in mist form, and its removal during lubrication of bearing 18, the corresponding level of oil within the sight chamber 50 reaches downwardly inclined vent hole 72 within side wall 52 of the oil level sight and bleed chamber 50. The inclined bleed hole 72 determines, therefore, the maximum oil level in both the closed bearing housing 12 and the sight chamber 50. Any additional oil will automatically run down the inclined bleed hole 72 and escape along the outer wall of the sight chamber 50 to fall to the ground or collect within a suitable excess oil or drip cup (not shown). By adjusting the vertical position of the sight chamber 50 on tube 46 and then tightening nut 62 the height of the inclined bleed hole 72 changes, which has the effect of raising or lowering the maximum level of collected lubricant 26 within bearing housing 12. Further, the level of accumulated oil or lack thereof is at all times visibly shown.

Figure 3:
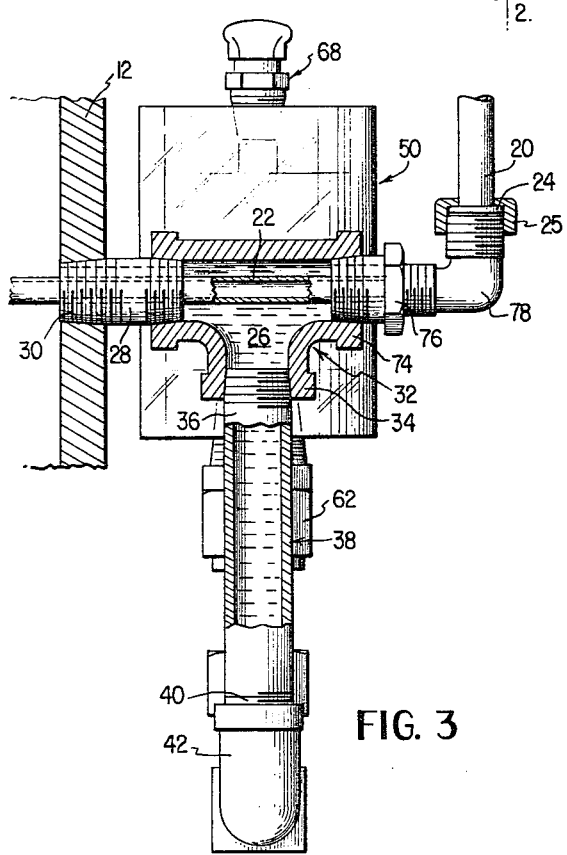
FIGURE 3 is an elevational view, in section, of the present invention taken about lines 3—3 of FIGURE 2.

As mentioned previously, an additional function of the assembly 10 is to allow the oil mist to be delivered to the closed bearing housing 12 in an expeditious manner. In this respect, at the right end 74 of the T 32 (FIGURE 3) fitting 76 carries elbow 78 to which is coupled both the vertical portion 20 of the oil mist delivery tube 20 and the horizontal internal oil mist delivery tube portion 22. Thus, fitting 76 not only supports the elbow 78 and oil mist delivery tube section 22, but also effectively fluid seals the same from the accumulated oil 26 which surrounds the oil mist delivery tube 22 within T 32. The oil mist which is delivered under pressure through vertical oil mist delivery tube 20, impinges against the wall of elbow 78 in making the right-hand turn to facilitate condensation of the liquid lubricant from the air portion of the mixture. Of course, all connections between the conduit elements must be sealed to prevent loss of lubricant. To insure against thread leak, Teflon tape may be applied to the threads. Tube 20 includes flange 24 and overlying threaded nut 25 forms with threaded elbow 78, a compression coupling.

From the above description, it is obvious that the present assembly performs multiple functions including the provision of the mist delivery connection to the bearing housing. The assembly provides a bleed hole to limit the maximum oil level in the bearing housing with the level being adjustable from seven thirty seconds to nineteen thirty second of an inch above the center of the mounting hole for the particular assembly shown. The employment of a transparent or translucent sight chamber permits ready visual indication of the oil level within the closed bearing housing. Further, the assembly serves to partially condense the mist by the abrupt change in flow direction in the tube connection elbow with the mist flowing through a 3/16 inch tube, for instance and discharging against the developed depression in the oil surface or bubbling through the oil, depending upon oil level, In order to adjust the bleed hole level to the required oil level within the closed bearing housing, it is only necessary to loosen the compression nut of fitting 62 and raise or lower the sight to position the inner end of the bleed hole 72 at the desired oil level. Of course, tube 46 may be replaced by a tube of shorter or longer length to vary the adjustment range. Vent 68 is provided to prevent the possibility of an air lock should, for any reason, the level in the sight exceed the bleed hole 72. It is to be further noted that the sight has been provided on the side of the T, such that the weight of the assembly applies a tightening load to the threads of the nipple 28, and wherever possible, the assembly 10 should be installed in this manner.

While the invention has been particularly shown and described with reference to a preferred embodiment, it will be understood by those skilled in the art that the foregoing and other changes in form and detail may be made thereing without departing from the spirit and scope of the invention.

What is claimed is:
1. An oil level sight and control assembly for a bearing carried by a closed housing, said assembly comprising: a combined oil level sight and bleed chamber formed of generally transparent material to show the level of accumulated lubricant, a bleed hole carried by the chamber side wall and inclining downwardly toward the chamber exterior to control the level of accumulation, a rigid conduit, one end of said rigid conduit coupled to said housing and having a terminal end vertically oriented, and means for threadably coupling said oil level sight and bleed chamber on the terminal end of said conduit to allow said chamber and its bleed hole to be adjusted vertically to thereby control the level of retained lubricant within said closed bearing housing.

2. In an oil-mist lubrication system including a closed bearing housing for accumulating condensed lubricant, a first conduit extending horizontally from said closed bearing housing, a small diameter oil mist delivery tube carried by said conduit, extending therethrough and terminating within said bearing housing, second conduit means coupled to said first conduit means and having a vertically extending terminal portion, a cylindrical, generally transparent oil level sight and bleed chamber, threadably coupled to the free end of said vertical conduit portion and having a bleed hole extending through said cylindrical chamber wall, whereby the oil level within said closed bearing housing may be varied by vertically adjusting said cylindrical chamber with respect to said second conduit means.

3. A system as claimed in claim 2 wherein said first conduit means includes a T coupling element with said small diameter oil mist delivery tube extending therethrough, said second conduit means includes a U-shaped conduit portion with one end thereof coupled to the base of said T coupling element, and the other end threadably and adjustably carrying said transparent, oil level sight and bleed chamber.

4. A system as claimed in claim 3 wherein said oil mist delivery tube is coupled to a vertical tube section and said system further includes elbow means connecting said vertical tube section and said horizontal delivery tube, whereby; said oil mist in contacting said elbow causes said oil to be partially condensed to facilitate the accumulation of liquid lubricant within said closed bearing housing.

References Cited

UNITED STATES PATENTS

| | | | |
|---|---|---|---|
| 635,210 | 10/1899 | Vriesland | 184—103 |
| 1,071,894 | 9/1913 | Doss | 184—103 |
| 1,350,643 | 8/1920 | Costa | 184—103 |
| 1,424,974 | 8/1922 | Barnett | 184—103 |
| 1,603,172 | 10/1926 | Watts. | |
| 1,705,845 | 3/1929 | Woodman. | |
| 1,923,857 | 8/1933 | Armantrout et al. | 184—103 |
| 1,972,962 | 9/1934 | Weber. | |

FRED C. MATTERN, Jr., Primary Examiner

MANUEL A. ANTONAKAS, Assistant Examiner

U.S. Cl. X.R.

184—6